United States Patent [19]

Akagi et al.

[11] Patent Number: 5,253,232
[45] Date of Patent: Oct. 12, 1993

[54] MAGNETO-OPTICAL RECORDING APPARATUS HAVING A MAGNETIC SLIDER WITH INCREASED RAIL WIDTH

[75] Inventors: Kyo Akagi, Fuchu; Takeshi Nakao, Sagamihara; Masahiro Ojima, Tokyo, all of Japan

[73] Assignee: Hitachi, Ltd., Tokyo, Japan

[21] Appl. No.: 501,545

[22] Filed: Mar. 30, 1990

Related U.S. Application Data

[63] Continuation-in-part of Ser. No. 153,094, Feb. 8, 1988, Pat. No. 5,020,041.

[30] Foreign Application Priority Data

Mar. 31, 1989 [JP] Japan .................................... 1-78235

[51] Int. Cl.⁵ .................... G11B 17/32; G11B 13/04; G11B 21/21; G11B 5/60
[52] U.S. Cl. ..................................... 369/13; 360/103; 360/114
[58] Field of Search .................. 360/103, 59, 114; 369/13

[56] References Cited

U.S. PATENT DOCUMENTS

| 4,214,287 | 7/1980 | Stomsta et al. ..................... 360/103 |
|---|---|---|
| 4,633,450 | 12/1986 | Gueugnon ............................ 369/13 |
| 4,849,952 | 7/1989 | Sliho .................................. 369/13 |
| 4,901,185 | 2/1990 | Kubo et al. ....................... 360/103 X |
| 4,937,801 | 6/1990 | Miura et al. ..................... 360/114 X |
| 5,020,041 | 5/1991 | Nakao et al. .................... 360/114 X |

FOREIGN PATENT DOCUMENTS

| 0068961 | 6/1981 | Japan .................................. 360/103 |
|---|---|---|
| 0058661 | 4/1984 | Japan .................................. 360/103 |
| 0160885 | 7/1986 | Japan .................................. 360/103 |
| 0012905 | 1/1987 | Japan .................................. 360/103 |
| 0078357 | 4/1988 | Japan .................................. 360/114 |
| 0136370 | 6/1988 | Japan .................................. 360/103 |
| 0079201 | 3/1990 | Japan .................................. 360/103 |

*Primary Examiner*—Stuart S. Levy
*Assistant Examiner*—Joseph A. Rhoa
*Attorney, Agent, or Firm*—Antonelli, Terry, Stout & Kraus

[57] ABSTRACT

A magneto-optical recording apparatus including a magnetic head applying a magnetic field to a magneto-optical recording medium in a region wider than a minimum bit record area thereby forming a magnetic field region, a beam source and an optical system forming on the magneto-optical recording medium a laser beam spot defining the minimum bit record area, a modulation unit for modulating at least one of the magnetic field and the laser beam thereby forming the laser beam spot within the range of the magnetic field region, and a mechanical unit for moving the magnetic field region and the laser beam spot relative to each other on the magneto-optical recording medium while the modulation unit is under operation, the magnetic head being floated to be spaced apart from the surface of the magneto-optical recording medium by a distance not smaller than 10 μm while the mechanical unit is under operation. The slider rails (11) each have a width of at least 2 mm, so as to increase the flying height of the slider (1017) over the medium.

28 Claims, 10 Drawing Sheets

MAGNETO-OPTICAL RECORDING APPARATUS HAVING A MAGNETIC SLIDER WITH INCREASED RAIL WIDTH

This application is a continuation-in-part of copending U.S. application Ser. No. 153,094, now U.S. Pat. No. 5,020,041, filed Feb. 8, 1988, the contents of which are incorporated herein by reference.

BACKGROUND OF THE INVENTION

This invention relates to a magneto-optical recording apparatus in which a magnetic head for magnetic field modulation recording purpose is mounted on a slider and floated away from a recording medium so that information can be recorded on the recording medium by the floating magnetic head in a crash-free relation while maintaining the required magnetic field strength and without being adversely affected by dust which may intrude into the apparatus.

A magnetic field modulation coil of a magnetic head used for recording information on a recording film of a magneto-optical disk is effectively to be located as close to the recording film as possible so as to obtain a high C/N ratio. However, in the case of a magneto-optical recording apparatus of media exchangeable type, a recording medium rotating at a high speed tends to greatly deviate by a maximum distance of ±100 μm from its normal plane of rotation. Therefore, a stationary coil of a magnetic head used for magnetic field modulation purpose is required to be spaced apart from the surface of the recording medium by a distance of at least 100 μm. In view of such a situation, JP-A-63-217548 proposes an apparatus in which a floating magnetic head using a head slider is employed as a means for stably bringing such a magnetic field modulation coil to a position close to the surface of a recording film while maintaining a predetermined distance between them.

SUMMARY OF THE INVENTION

However, the prior art apparatus disclosed in JP-A-63-217548 has such a weak point that its reliability cannot be secured against dust externally intruding into the apparatus. That is, there is a great tendency of occurrence of the so-called head crash which means that the surface of the recording medium is contacted by the magnetic head due to unstable floating movement of the magnetic head attributable to intrusion of dust and attachment of the dust on the surface of the magnetic head slider.

It is an object of the present invention to provide a highly reliable, magneto-optical recording apparatus which employs a floating magnetic head and in which undesirable head crash hardly occurs.

In accordance with one aspect of the present invention which attains the above object, there is provided a magneto-optical recording apparatus comprising a magnetic head applying a magnetic field to a magneto-optical disk, a beam source and an optical system directing a laser beam toward a field-applied region of the magneto-optical disk, rotating means for rotating the magneto-optical disk, a magnetic head slider carrying the magnetic head for floating it away from the magneto-optical disk with the rotation of the magneto-optical disk, and modulation means for modulating at least one of the laser beam and the magnetic field by a signal to be recorded, said magnetic head slider acting to cause floating movement of the magnetic head away from the magneto-optical disk while the modulation means is under operation so that the magnetic head is spaced apart from the magneto-optical disk by a distance not smaller than 10 μm.

In accordance with another aspect of the present invention which attains the above object, there is provided a magneto-optical recording apparatus comprising a magnetic head applying a magnetic field to a magneto-optical recording medium in a region wider than a minimum bit record area thereby forming a magnetic field region, a beam source and an optical system forming on the magneto-optical recording medium a laser beam spot defining the minimum bit record area, modulation means for modulating at least one of the magnetic field and the laser beam thereby forming the laser beam spot within the range of the magnetic field region, and mechanical means for moving the magnetic field region and the laser beam spot relative to each other on the magneto-optical recording medium while the modulation means is under operation, the magnetic head being spaced apart from the magneto-optical recording medium by a distance not smaller than 10 μm while the mechanical means is under operation.

In a magneto-optical recording apparatus in which the information recording density on a magneto-optical recording medium is determined by the diameter of a laser beam spot, information can be recorded and reproduced while avoiding undesirable head crash even when the spacing between the magnetic head and the recording medium is larger than 10 μm, as described later with reference to FIG. 4. In view of the performance of such a magneto-optical recording apparatus, the present invention provides a magneto-optical recording apparatus of media exchangeable type in which the floating magnetic head can be spaced apart by a large distance from the recording medium so as to deal with a high possibility of head crash due to intrusion of dust.

In accordance with still another aspect of the present invention, there is provided a magneto-optical recording apparatus comprising a magnetic head applying a magnetic field to a magneto-optical disk, a beam source and an optical system directing a laser beam toward the magneto-optical disk, rotating means for rotating the magneto-optical disk, and a magnetic head slider carrying the magnetic head, the magnetic head slider including at least two slider rails each having a width not smaller than at least 2 mm.

When the dust is, for example, sand having no stickiness, the flying height of the floating magnetic head is increased so as to avoid biting of the dust between the magnetic head and the disk. In a preferred form, when the dust is, for example, sticky smoke of a cigarette, the attached dust is removed by contact start/stop (CS/S) operation thereby securing the stability of floating movement of the magnetic head. In the magnetic head slider including one or plural floating rails, it is very effective, for the purpose of increasing the flying height, to increase the width of the slider rails and to decrease the value of the load imposed on the slider. When the slider is of a plain type, the flying height and the stability of head floating can be secured by optimizing its taper length and taper angle. On the other hand, when the slider is of a crown type, the flying height and the stability of head floating can be secured by optimizing the height of its projecting surface and the position of the apex of its projecting surface.

The flying height of the head slider having the optimized configuration is 10 μm to 50 μm which is larger than the maximum value of the particle size of dust particles floating in an environment of an ordinary room. Therefore, in such an environment, the intruding dust would neither bite into the surface of the head slider nor into the surface of the recording medium. Further, the dust that may adhere to the surface of the head slider or the surface of the recording medium is easily stripped off when the surface of the head slider is brought at a low speed into contact with the surface of the recording medium during the contact start/stop operation.

DETAILED DESCRIPTION OF THE EMBODIMENTS

Figure 1A:
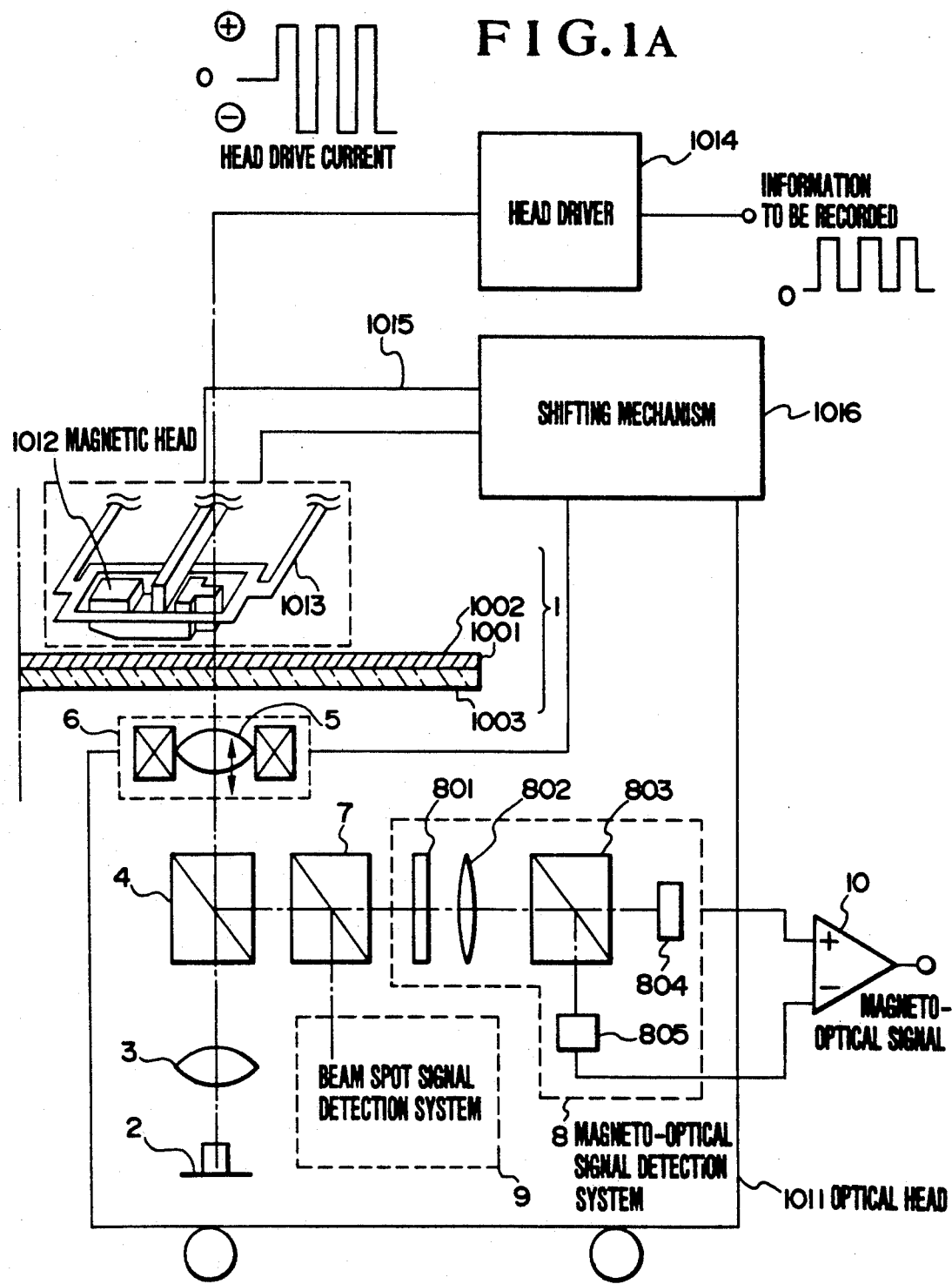
FIG. 1A is a block diagram of a preferred embodiment of the magneto-optical recording apparatus according to the present invention.

FIG. 1A is a block diagram of a preferred embodiment of the magneto-optical recording apparatus according to the present invention. Referring to FIG. 1A, a magneto-optical disk 1 which is a rotary record carrier includes a disk-shaped transparent base 1003, and a film of a magneto-optical recording medium 1001 formed on one surface of the base 1003 and having a magneto-optical effect, and a protection film 1002 covering the recording medium 1001. In an optical head 1011, a beam of light, for example, a laser beam emitted from a semiconductor laser source 2 is turned into a parallel laser beam by a collimator lens 3 and is then incident on a converging lens 5 through a beam splitter 4. The laser beam converged by the lens 5 is incident on the magneto-optical disk 1 from the side of the disk-shaped transparent base 1003 to form a very small laser beam spot having a diameter of about 1 μm on the recording film 1001. The converging lens 5 is mounted on an actuator 6 so that the converging lens 5 can follow up vertical movement of the magneto-optical disk 1 thereby always focusing the laser beam on the recording film 1001 and so that the lens 5 can follow up eccentricity of information recording tracks on the magneto-optical disk 1 thereby always forming the spot of the laser beam on any desired track on the disk 1. After the laser beam reflected from the disk 1 passes through the converging lens 5 and is then reflected by the beam splitter 4, the laser beam is guided through another beam splitter 7 to a magneto-optical signal detection purpose optical system 8 and to a beam-spot control signal detection purpose optical system 9 which detects out of focusing, out of tracking, etc.

One form of the magneto-optical signal detection purpose optical system 8 is shown in detail in FIG. 1A. The illustrated magneto-optical signal detection purpose optical system 8 is of a differential signal detection type using a λ/2 plate 801 and a polarized beam splitter 803. The laser beam guided to the magneto-optical signal detection purpose optical system 8 passes through the λ/2 plate 801 and a lens 802 and is then split by a polarized beam splitter 803 into polarized beam components s and p which are supplied to beam detectors 804 and 805 respectively to be converted into corresponding electrical signals. These electrical signals are applied to a differential amplifier 10 to appear as a magneto-optical signal from the differential amplifier 10.

A magnetic head 1012 is disposed opposite to the optical head 1011 on the side of the recording film 1001 of the disk 1. For the purpose of illustration, the magnetic head 1012 is shown in FIG. 1A in a relation rotated through an angle of 90° from its practical arrangement and also in an enlarged perspective fashion. As described later, the magnetic head 1012 is composed of a coil part applying a magnetic field to the recording film 1001 of the disk 1 and a slider part 1017 acting to float the entire magnetic head 1012. During rotation of the disk 1, the magnetic head 1012 is floated by an air pressure induced by the rotation of the disk 1.

The magnetic head 1012 is pressed by a suspension spring 1013 toward the disk 1 by a load as described later. A head shifting mechanism 1016 for vertically shifting the magnetic head 1012 is provided for the purpose of permitting replacement of the magnetic head 1012.

Further, the magnetic head 1012 is integrally coupled by a supporting arm 1015 to the optical head 1011 so as to make interlocking operation with the optical head 1011, so that the magnetic head 1012 can always be located directly above the laser beam spot formed on the disk 1.

The optical head 1011 is moved in the radial direction of the disk 1 by means such as a linear motor or a stepping motor.

For the purpose of recording information on the recording film 1001 of the disk 1, the magnetic head 1012 or the optical head 1011 is driven while modulating the magnetic field or laser beam by the information to be recorded. In the embodiment shown in FIG. 1A, a magnetic head driver circuit 1014 is provided for driving the magnetic head 1012.

Figure 1B:
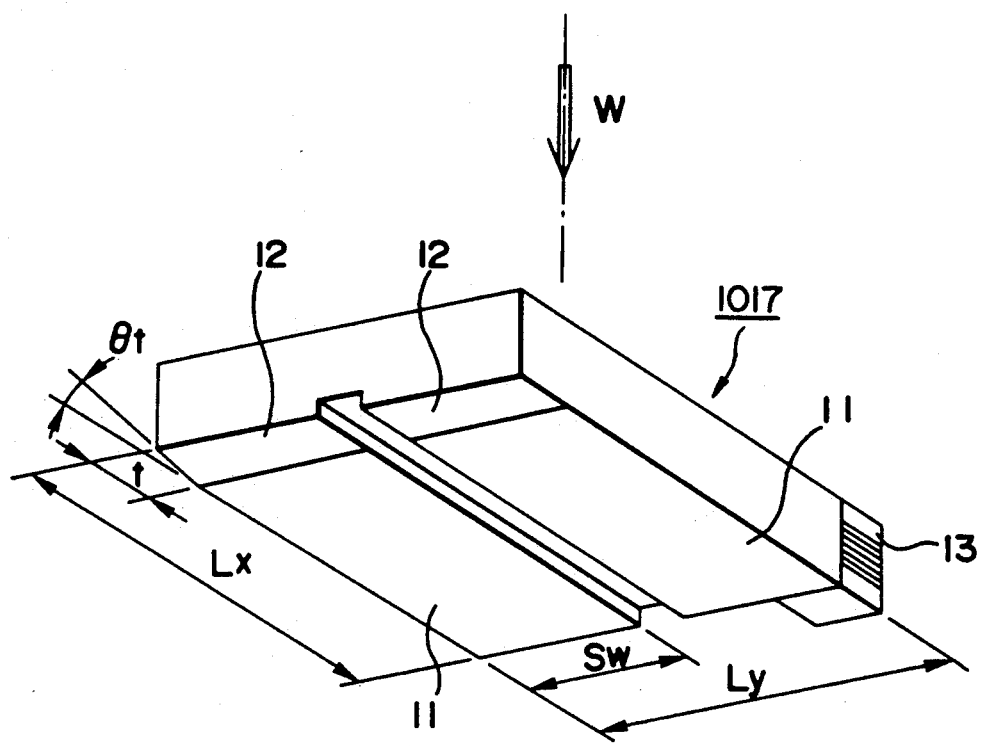
FIG. 1B shows schematically the basic configuration of the head slider preferably employed in the apparatus of the present invention.

FIG. 1B shows a basic configuration of the head slider 1017 employed in the present invention. Referring to FIG. 1B, the head slider 1017 is of a two rail type having two slider rails 11. Each slider rail 11 acts to produce an air pressure thereby contributing to floating of the magnetic head 1012, and a tapered leading edge portion 12 continuous to each slider rail 11 acts to guide the air pressure toward each slider rail 11. Any desired head floating characteristic can be provided by optimizing the slider rail width Sw, head pressurizing load w, slider length Lx, taper length t and taper angle $\theta t$ in FIG. 1B. The symbol Ly designates the head width.

Figure 2:
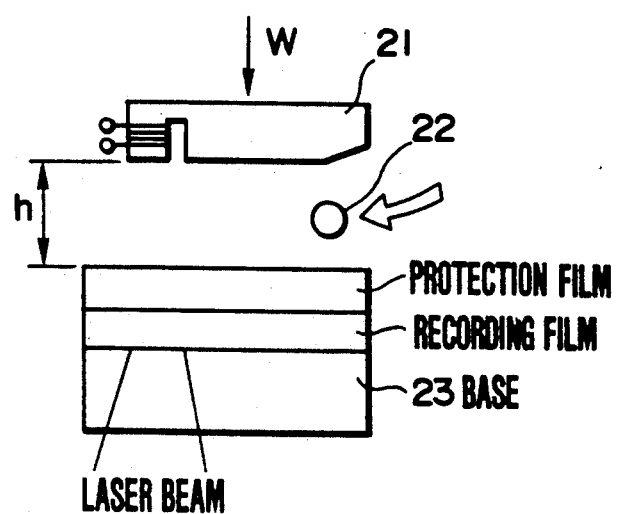
FIG. 2 generally illustrates the effect of floating a magnetic head slider until it has a large flying height relative to a recording medium.

FIG. 2 generally illustrates the effect of floating a head slider 21 by a large distance or flying height h relative to a magneto-optical recording disk 23. It will be seen in FIG. 2 that, when the flying height h has a sufficiently large value, a dust particle 22 that may externally intrude into the space between the slider 21 and the recording medium 23 passes through the space without being arrested by the lower surface of the slider 21 and the upper surface of the recording medium 23.

Figure 3:
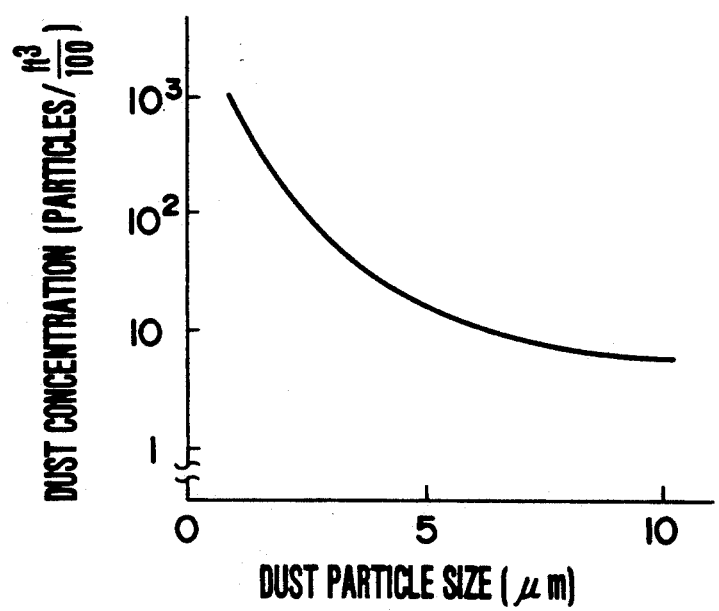
FIG. 3 is a graph showing the results of actual measurement of the distribution of the particle size of dust particles floating in an ordinary room.

FIG. 3 is a graph showing the results of actual measurement of the distribution of the particle size of dust floating in an ordinary room. It will be seen in FIG. 3 that the number of dust particles having a particle size larger than 1 $\mu$m is extremely small. For example, when the slider has a surface area of 50 mm², the maximum number of dust particles having a particle size larger than 10 $\mu$m and passing the space beneath the slider will be only 8.44 per 3,000 revolutions of the disk.

Figure 4:
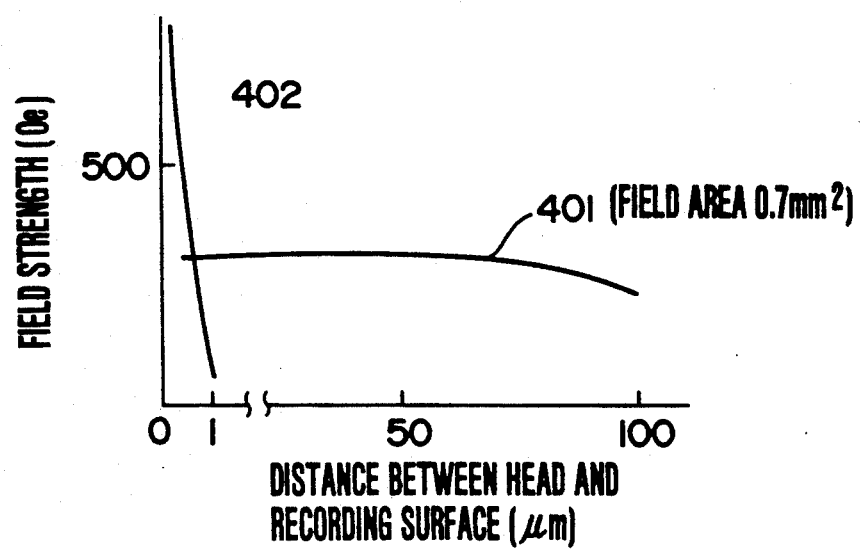
FIG. 4 is a graph showing the results of actual measurement of the relation between the magnetic field strength and the distance between the magnetic head and the recording medium.

FIG. 4 is a graph showing the results of actual measurement of the relation between the magnetic field strength and the distance between the magnetic head and the recording film. In the magneto-optical recording apparatus of the present invention, information is recorded on the recording medium by modulating the magnetic field at the location of the recording meidum irradiated with the spot of the laser beam. In the read mode, the laser beam is directed toward the recording medium so as to detect the recorded information signal. In the record mode, the area (the magnetic field area) to which the magnetic field is applied is wider than the area of the laser beam spot, and, because the minimum unit of the recording density is determined by the diameter of the laser beam spot, the magnetic field area is not pertinent to the recording density. In FIG. 4, the curve 402 represents the characteristic of a conventional magnetic disk apparatus of magnetically writing and reading type. Because, in such a magnetic disk apparatus, the recording density is determined by the magnetic field area itself, it is necessary to limit the magnetic field area to a very small value of the order of, for example, 20 $\mu$m × 1 $\mu$m. In the case of the magnetic head having such a small magnetic field area, the magnetic field strength becomes so small until finally the recording operation cannot be practically made, as shown by the curve 402 in FIG. 4, with the increase in the distance between the magnetic head and the recording surface of the recording medium. On the other hand, the curve 401 in FIG. 4 represents the characteristic of a magneto-optical disk apparatus using a magnetic head whose magnetic field area need not be limited to a very small value. The magnetic field area of the magnetic head used in this magneto-optical disk apparatus is, for example, larger than 0.1 mm² as described in JP-A-63-217548 cited already. Thus, even when the distance between the magnetic head and the recording surface is increased to a value larger than 10 $\mu$m, any appreciable change does not appear in the magnetic field strength, and information can be recorded on the recording surface of the recording medium while maintaining the above distance between the magnetic head and the recording surface. It will be seen from the curve 401 shown in FIG. 4 that, in the magnetic head having its magnetic field area as wide as 0.1 mm² corresponding to the predetermined diameter of the laser beam spot, the magnetic field strength is hardly degraded even when the magnetic head is spaced by a distance of 50 $\mu$m from the recording surface.

It can be concluded from FIGS. 2, 3 and 4 that the flying height of the magnetic head is to be selected to be not smaller than 10 $\mu$m, preferably, between 10 $\mu$m and 50 $\mu$m, so that the magnetic head slider can operate with high reliability without impairing the magneto-optical recording performance of the magneto-optical recording apparatus.

Figure 5:
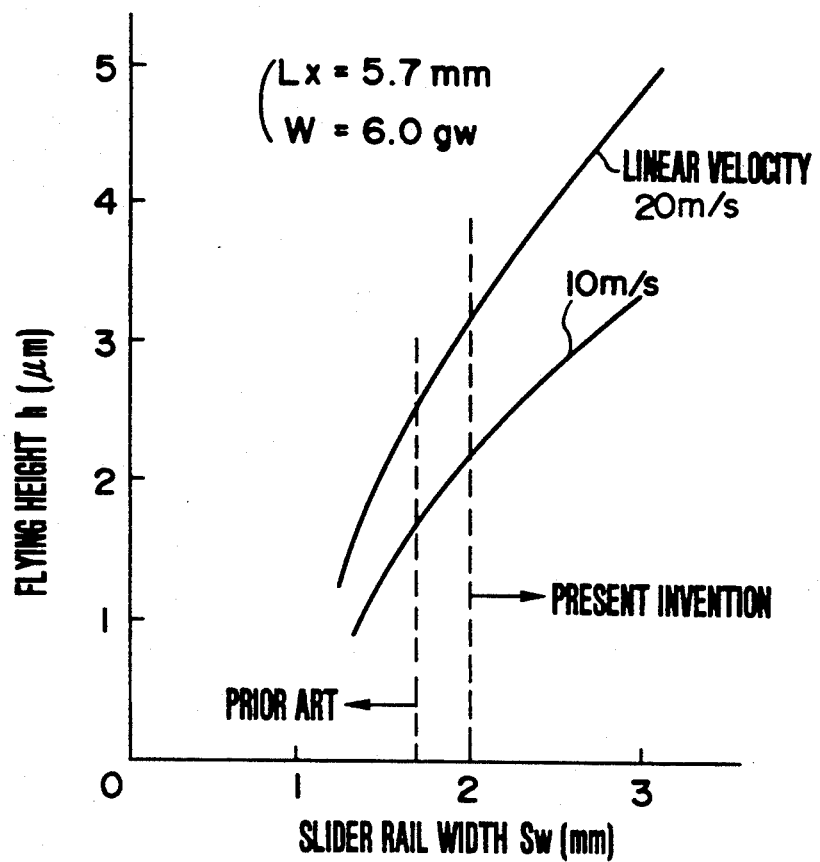
FIG. 5 is a graph showing the results of computer simulation to find how the flying height of the magnetic head is influenced by the slider rail width Sw of the magnetic head slider.

FIG. 5 is a graph showing the results of computer simulation to find how the flying height of the magnetic head is influenced by the slider rail width Sw of the magnetic head slider. In this simulation, the slider length is Lx=5.7 mm, and the pressurizing load is W=6.0 gw. The slider rail width Sw exhibits a great effect as a means for simply increasing the flying height. When, as a practical example, the magnetic head is floated to a level above a magneto-optical disk having a diameter of 5 inches, the data area that can be effectively used for recording will decrease with the increase in the surface area of the slider. Further, the larger the slider rail width Sw, the head width Ly becomes larger. Thus, the difference between the linear velocity at the outer slider rail and that at the inner slider rail increases at the radially inner area of the disk, and the flying height h may become non-uniform. Therefore, the value of the head width Ly is limited, and, in the case of the disk having the diameter of 5 inches, the head width Ly shown in FIG. 1B is given by the following relation:

Ly<15 mm

Figure 6:
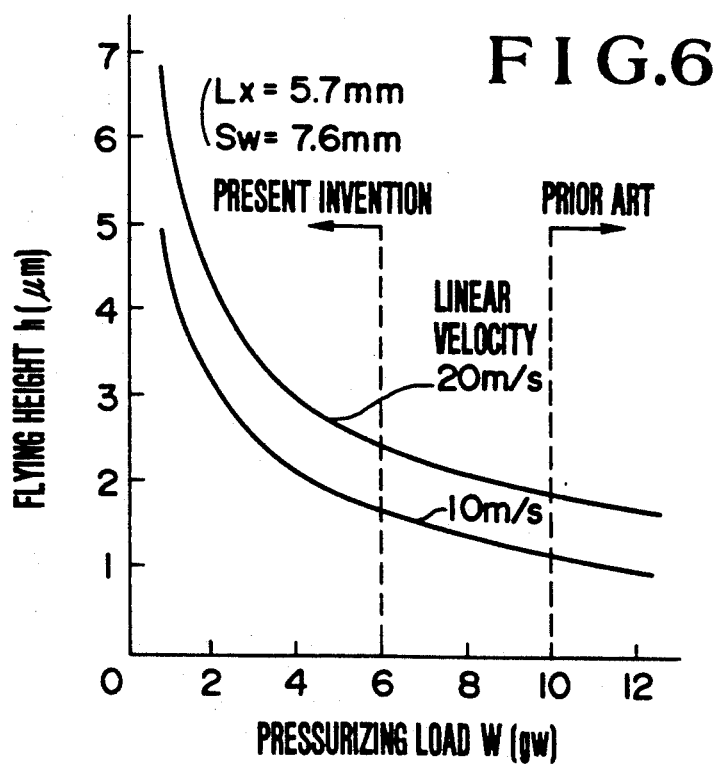
FIG. 6 is a graph showing the results of computer simulation to find the relation between the pressurizing load W of the suspension spring and the flying height of the magnetic head.

FIG. 6 is a graph showing the results of computer simulation to find the relation between the pressurizing load W of the suspension spring and the flying height h of the head. In this case, the slider length is Lx=5.7 mm, and the slider rail width is Sw=7.6/2 mm. It will be seen in FIG. 6 that the pressurizing load W exhibits also a great effect as a means for increasing the flying height h. Theoretically, there is the following relation among the pressurizing load W, the linear velocity V and the flying height h:

$$W \propto \frac{V}{h^2}$$

The above relation teaches that, when the linear velocity V is maintained constant, the pressurizing load W is inversely proportional to the second power of the flying height h. However, there is the following relation between the pressurizing load W and the air bearing stiffness K of air flowing beneath the slider:

$$W \propto \frac{Kh}{2}$$

The above relation teaches that the smaller the pressurizing load W, the flying height h becomes larger, and the air bearing stiffness K becomes inevitably small. This means that the force of the air bearing supporting the slider surface is weakened, and the flying height h will become unstable against variations that may occur during floating the magnetic head. Therefore, when the stability of floating the magnetic head is taken into consideration, the pressurizing load W imparted by the suspension spring system in use is to be limited to a certain range, and its optimum value is about 5 gw.

Figure 7:
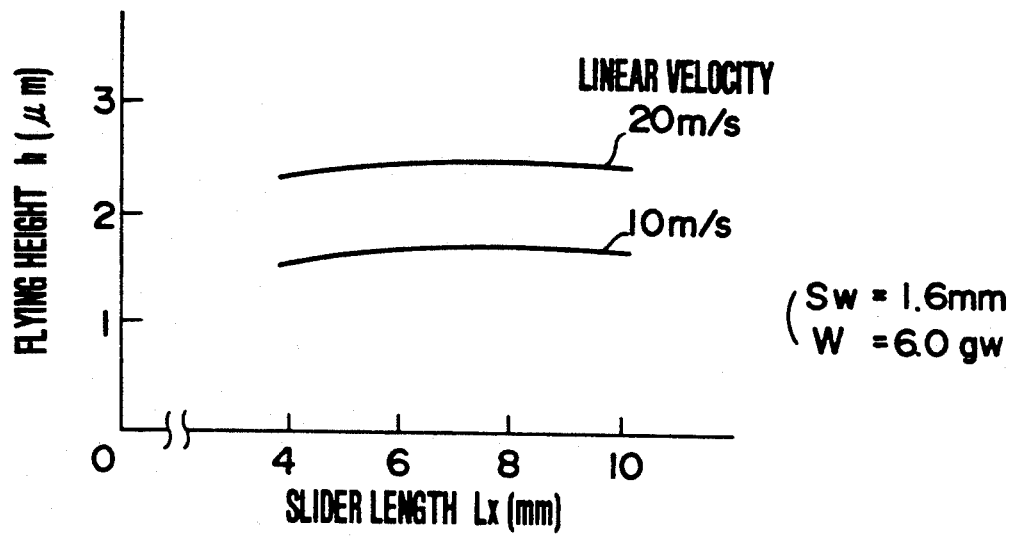
FIG. 7 is a graph showing the results of computer simulation to find the relation between the slider length Lx and the flying height of the magnetic head.

FIG. 7 is a graph showing the results of computer simulation to find the relation between the slider length Lx and the flying height h of the head. It will be seen in FIG. 7 that the flying height h is not appreciably affected by the slider length Lx although it may be affected somewhat by the slider rail width Sw. However, the slider length Lx is to be selected to be at least equal to the head width Ly because the slider length Lx shorter than the head width Ly will result in degraded dynamic floating stability in the pitching direction.

Figure 8:
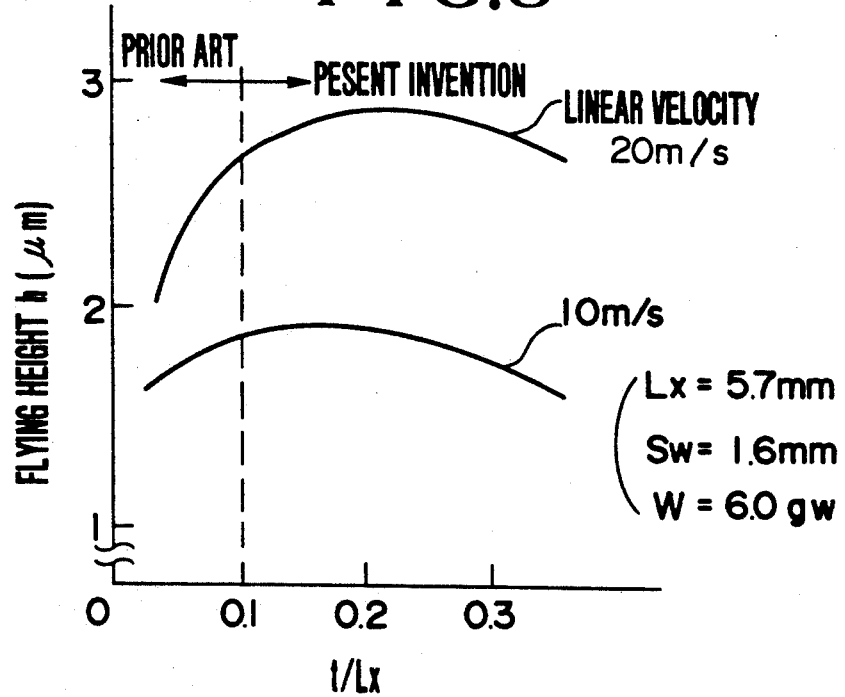
FIG. 8 is a graph showing the results of computer simulation to find how the floating height of the magnetic head changes when the slider is of a plain type and the taper length of its tapered leading edge is changed.
Figure 9:
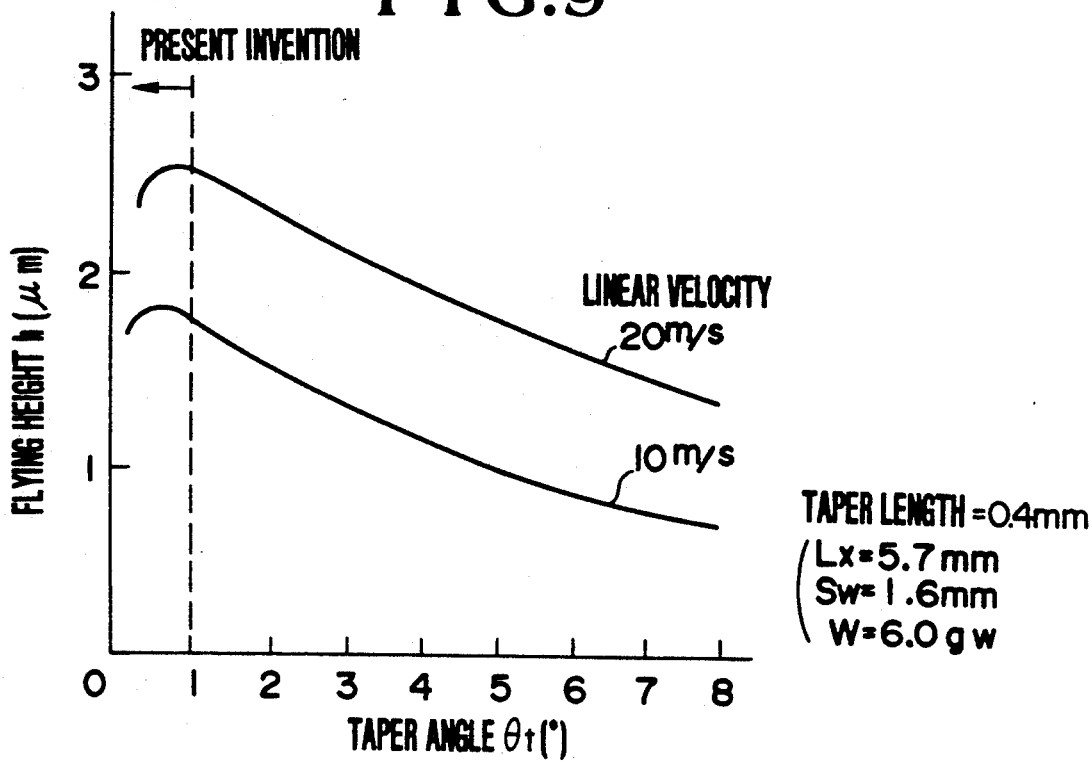
FIG. 9 is a graph showing the results of computer simulation to find the relation between the flying height and the taper angle of the tapered leading edge of the head slider.

FIG. 8 is a graph showing the results of computer simulation to find how the flying height of the magnetic head changes when the slider is of a plain type and the taper length of its leading edge is changed. The optimum value of this taper length required for ensuring a large flying height is 0.1 to 0.5 in its proportion to the full slider length. FIG. 9 is a graph showing the results of computer simulation to find the relation between the flying height h and the taper angle $\theta t$ of the head slider. It will be seen in FIG. 9 that this taper angle $\theta t$ has also an optimum range, and, when the taper angle $\theta t$ is greater than 1°, the flying height h decreases, and the dynamic floating stability is degraded.

Figure 10:
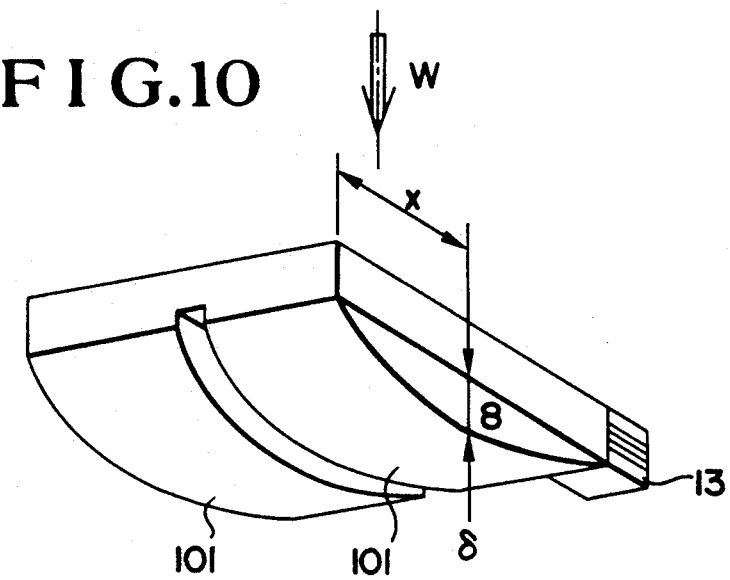
FIG. 10 is a perspective view to show another basic configuration of the head slider preferably used in the present invention.

FIG. 10 is a perspective view to show another basic configuration of the slider preferably used in the present invention. In the basic slider configuration shown in FIG. 10, its slider rails 107 have surfaces of the second degree perpendicular to the sides of the slider. The flying height h changes depending on both the value x representing the distance between the apex of each slider rail surface and the leading edge of the slider rail and the value $\delta$ representing the amount or height of protrusion of each of the slider rail surfaces from the slider body.

Figure 11:
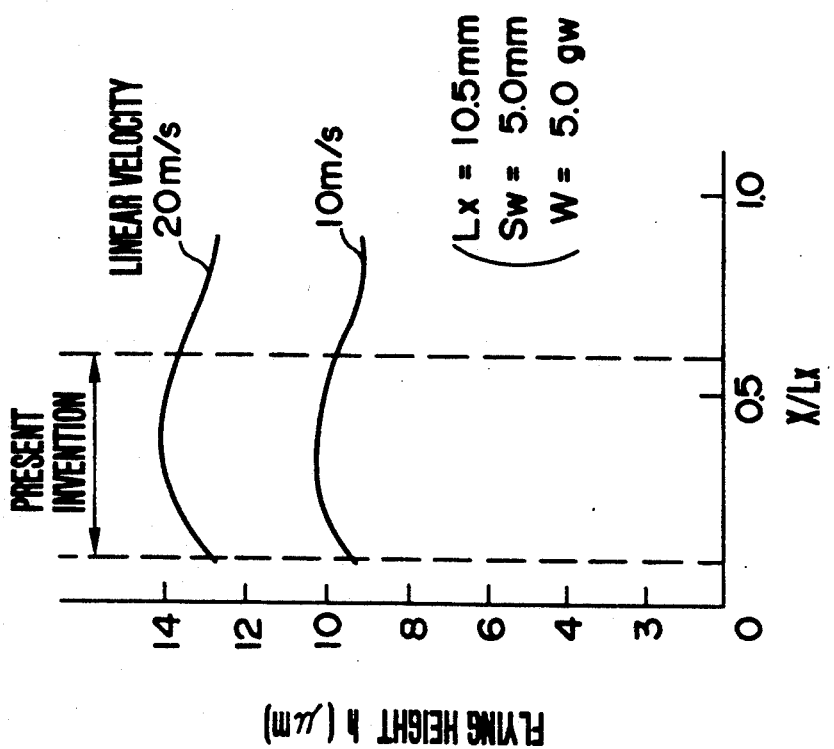
FIG. 11 is a graph showing the results of computer simulation to find the relation between the flying height of the magnetic head and the position of the apex of the slider surface of second degree in the head slider shown in FIG. 10.

FIG. 11 is a graph showing the results of computer simulation to find the relation between the flying height h and the ratio x/Lx in the slider shown in FIG. 10. It will be seen in FIG. 11 that the flying height h shows its maximum value when the apex described above is located at a position where the ratio x/Lx between the distance x and the full slider length Lx lies between 0.1 and 0.6, although it may slightly differ depending on the size of the slider.

Figure 12:
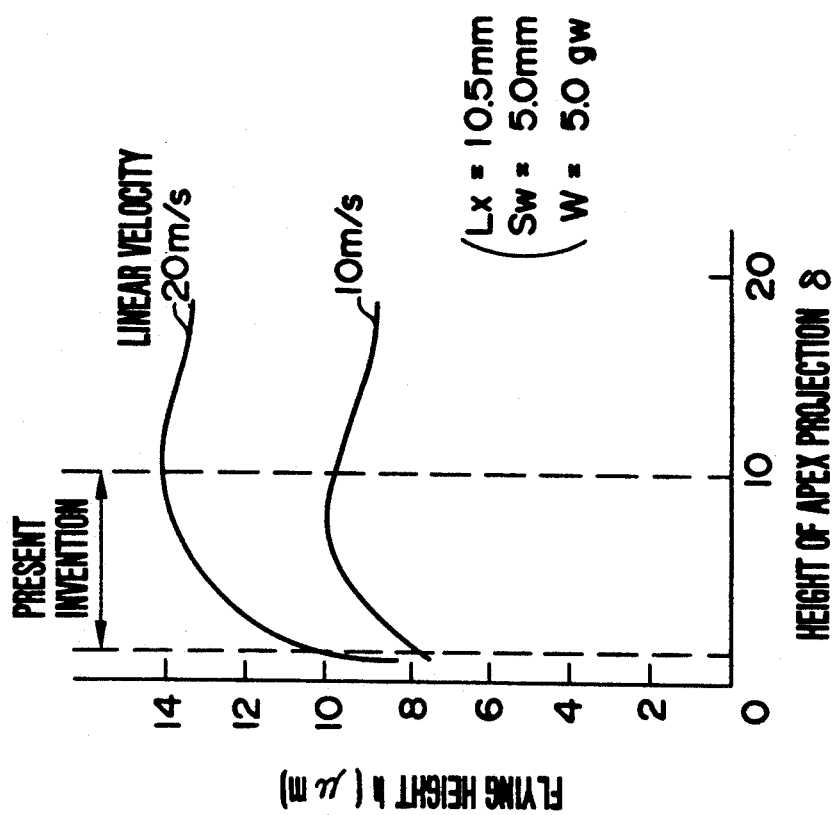
FIG. 12 is a graph showing the results of computer simulation to find the relation between the flying height of the magnetic head and the projection and the height of the apex in the head slider shown in FIG. 10.

FIG. 12 is a graph showing the results of computer simulation to find the relation between the flying height h and the height of apex projection $\delta$ in the slider shown in FIG. 10. It will be seen in FIG. 12 that the flying height h shows a maximum value regardless of the size of the head slider when the height of projection $\delta$ at the apex described above is 1 to 10 $\mu$m, preferably 4 to 8 $\mu$m.

The desired large flying height of the head slider can be achieved by any one of the methods described above, and by a suitable combination of the methods described above, a flying height not smaller than 10 $\mu$m to meet the design of the disk apparatus can also be achieved. Dust particles intruding from the outside pass beneath the slider surface, and no rubbing contact or crash occurs between the flying magnetic head and the magneto-optical disk. However, sticky dust particles having a small particle size may be arrested by and adhere to both the slider surface and the recording medium surface. In order to avoid the undesirable adhesion of the sticky dust particles, it is preferable to employ, for example, the contact start-stop (CS/S) operation thereby forcedly removing the adhering sticky dust particles. Although, in such a case, the slider surface necessary makes surface-surface contact with the recording medium surface, application of or coating a lubricant on the slider surface improves the reliability. The effect similar to that described above is also exhibited when the head slider is made of a porous sintered material such as $3Al_2O_3.2SiO_2$ or SiC impregnated with a lubricant.

Figure 13A:
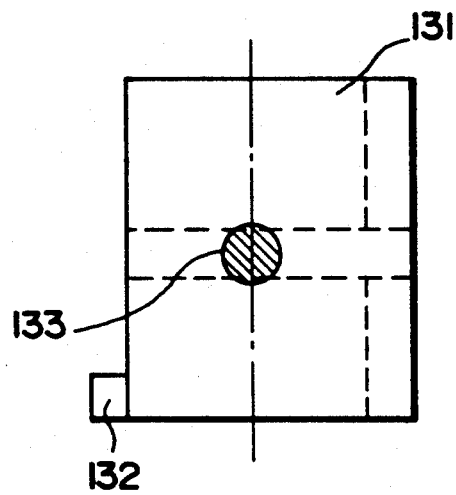
FIGS. 13A, 13B and 13C are conceptual diagrams to illustrate various manners of slider supporting by a suspension spring.
Figure 13B:
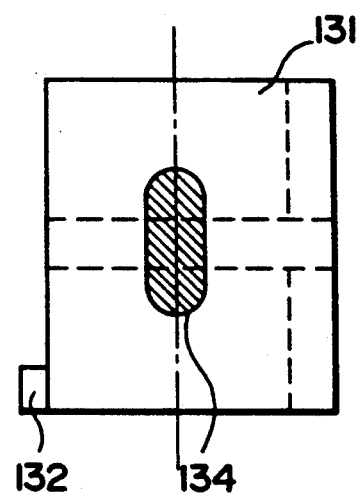
Figure 13C:
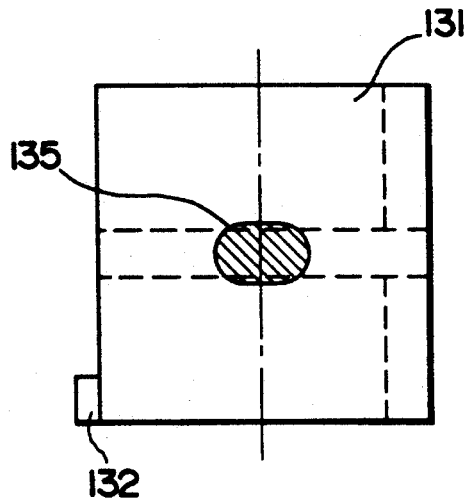

FIGS. 13A, 13B and 13C are schematic back plan views to show various manners of supporting a slider 131 carrying a magnetic head element 132. FIG. 13A illustrates a prior art manner of slider supporting by a suspension spring, and a pivot 133 having a circular sectional shape is used to support the slider 131 by the suspension spring in a point contact fashion, thereby providing a great degree of freedom for making pitching, rolling, yawing or like motion. However, in the head slider employed in the present invention, a pivot 134 having an elliptical sectional shape is used to support the slider 131 by the suspension spring in a linear contact fashion as shown in FIG. 13B so as to ensure dynamic flying stability of the slider 131. Thus, this support mode is effective for restricting the degree of freedom of motion in the rolling direction. Also, when a pivot 135 having an elliptical sectional shape is used to support the slider 131 by the suspension spring in a linear contact fashion as shown in FIG. 13C, such a support mode is effective for restricting the degree of freedom of motion in the pitching direction. The present invention exhibits its marked effect even when the individual parameters described above are separetely optimized. However, it is most preferable to optimize the combination of those parameters.

Figure 15:
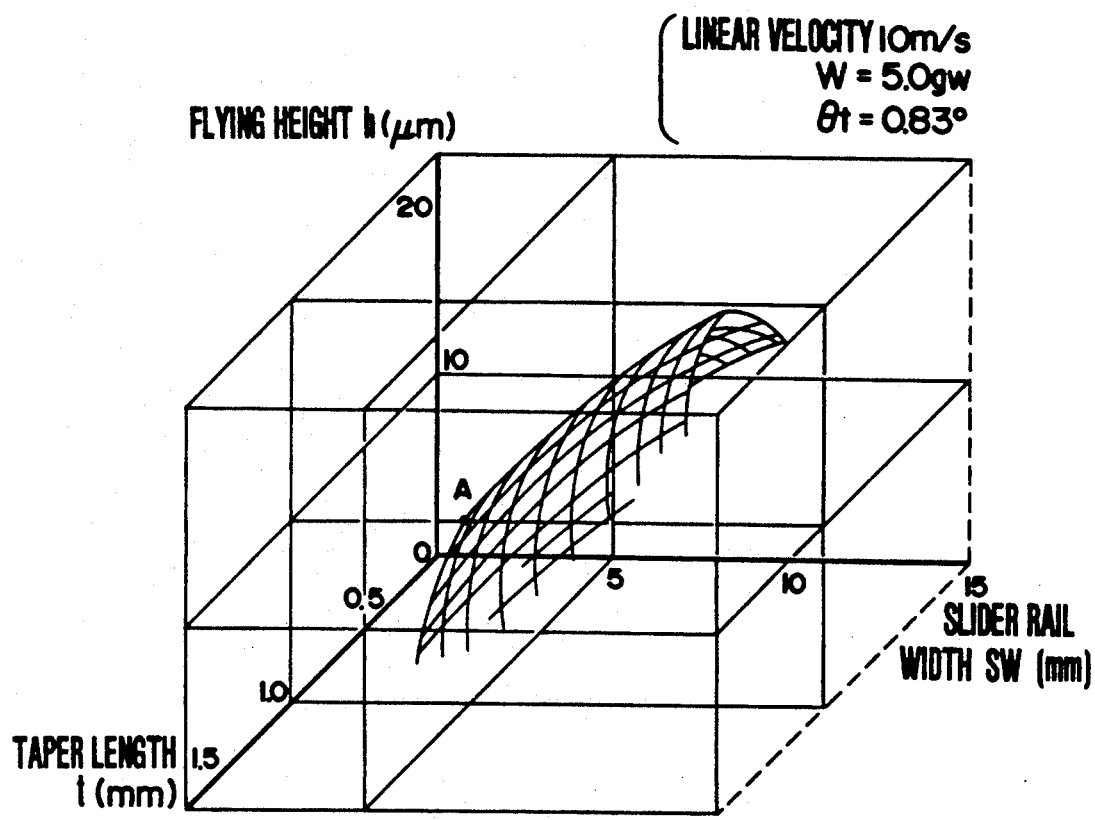
FIG. 15 is a graph showing the relation between the rail width and the taper length of the slider when the linear velocity at a radially innermost part of a 5.25-inch disk is 10 m/s.

The pressurizing load W among those parameters is desirably selected to be about 5.0 gw from the viewpoint of stabilization of the floating height as described already. The selectable range of the taper angle $\theta t$ of the tapered leading edge of the head slider is narrow, and the value of about 0.8° at the peak position shown in FIG. 9 is usually adopted. As described already, the reliability of the magneto-optical recording apparatus can be secured when the flying height of the head slider is not smaller than 10 μm in the range of steady operation of the apparatus in view of the distribution of the particle size of dust particles floating in an ordinary room. FIG. 15 is a graph showing the relation between the slider rail width Sw and the taper length t of the head slider when the linear velocity at a radially innermost part of a 5.25-inch disk in a disk apparatus is 10 m/s. The above relation is represented in the form of a saddle in the range where the flying height is not smaller than 10 μm. The point A in FIG. 15 is an optimum point under the condition in which the flying height h is more than 10 μm and the slider rail width Sw is minimum.

Figure 14:
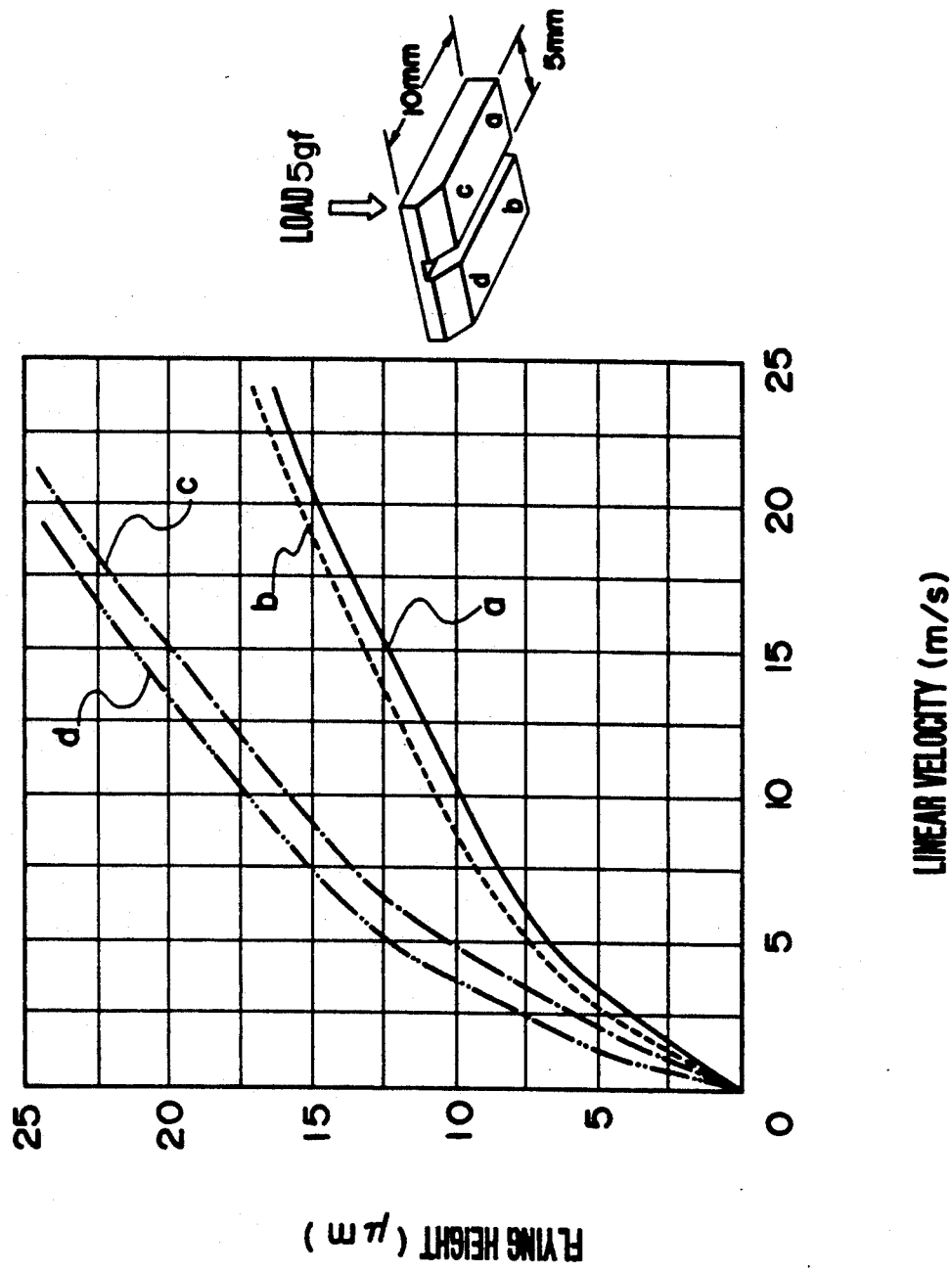
FIG. 14 is a graph showing the relation between the linear velocity of a magneto-optical disk and the distance between the magnetic head and the recording medium in the present invention.

FIG. 14 represents the floating characteristic of the head slider in the vicinity of the point A described above.

FIG. 14 is a graph showing the relation between the linear velocity of a magneto-optical disk and the distance between the magnetic head used in the present invention and the recording film of the disk to illustrate how the magnetic head can be stably floated under an optimized condition. When the principle of floating the magnetic head according to the present invention is applied to a 3.5-inch disk or a 5.25-inch disk, the size of the magnetic head slider is limited from the aspect of the efficiency of utilization of the disk surface. In the form of the magnetic head slider shown in FIG. 14, the slider carrying the magnetic head having a width of about 10 mm is designed to have a length of 10 mm and a slider rail width of 5 mm and is pressurized by a load of 5 gw. In this case, the flying height and stability of the floating magnetic head are taken into account so as to optimize the individual parameters. The curves a and c shown in FIG. 14 represent actually measured values of the flying height of respective points a and c located on the radially inner side of the disk. It can be seen from FIG. 14 that, when, for example, the 5.25-inch disk is rotated in its operating linear velocity range between 10 m/s and 20 m/s, a flying height not smaller than 10 μm can be secured.

It will be understood from the foregoing detailed description of the present invention that the recording characteristic required for a magneto-optical disk can be fully satisfied, and an expected reduction in the reliability of magneto-optical recording due to the use of a floating magnetic head can be minimized by optimizing the flying height and configuration of the magnetic head slider. Therefore, the present invention contributes greatly to the desired excellent performance of a magneto-optical disk apparatus.

What is claimed is:

1. A magneto-optical recording apparatus comprising:
   a magnetic head applying a magnetic field to a magneto-optical disk;
   a beam source and an optical system directing a laser beam toward said magneto-optical disk;
   rotating means for rotating said magneto-optical disk; and
   a magnetic head slider carrying said magnetic head, said magnetic head slider having means for producing lift for causing sufficient magnetic head floating movement to substantially prevent crash including at lest two slider rails each having a width not smaller than at least 2 mm along a length thereof and a tapered portion having a taper angle $\theta t$, wherein $0 < \Gamma t \leq 1°$, so that the magnetic head is spaced apart from a surface of the magneto-optical disk by a distance not smaller than 10 μm.

2. A magneto-optical recording apparatus according to claim 1, wherein a suspension spring supporting said magnetic head slider applies a pressurizing load not larger than 6 gw.

3. A magneto-optical recording apparatus according to claim 1, wherein said magnetic head slider has a length not smaller than 5 mm.

4. A magneto-optical recording apparatus according to claim 1, wherein a ratio between the length of said tapered portion and the full slider length is selected to be 0.1 to 0.5.

5. A magneto-optical recording apparatus according to claim 4, wherein the taper angle of said tapered air introducing leading edge portion for producing lift thereby floating said head slider is selected to be smaller than 1°.

6. A magneto-optical recording apparatus according to claim 1, wherein said magnetic head slider is of a crown type having a slider surface of second degree, and the apex of said slider surface opposite to said magneto-optical disk is located at a position where the ratio of the distance between the apex and the leading edge of said slider to the full slider length is 0.1 to 0.6.

7. A magneto-optical recording apparatus according to claim 6, wherein said apex of said slider surface projects by a height of 1 to 10 μm relative to the leading and trailing edges of said head slider.

8. A magneto-optical recording apparatus according to claim 1, wherein said magnetic head slider is made of a sintered body of a pore-free or porous material, and means is provided for holding a lubricant on the slider surface.

9. A magneto-optical recording apparatus according to claim 1, wherein at least one of a contact start and stop operation is carried out at a predetermined time interval when said apparatus is in at least one of a starting state, in a stopped state, and when said apparatus is under operation.

10. A magneto-optical recording apparatus according to claim 1, wherein said suspension spring supports said magnetic head slider by a pivot making linear contact with said suspension spring.

11. A magneto-optical recording apparatus according to claim 1, wherein said magnetic head performs its information recording operation in a state floated by a distance of 10 to 50 μm from the surface of said magneto-optical disk by the function of said magnetic head slider.

12. A magneto-optical recording apparatus according to claim 1, wherein said magneto-optical disk is exchangeable.

13. A magneto-optical recording apparatus according to claim 1, wherein a magnetic field region having an area larger than 0.1 mm² is provided b the magnetic field applied to said magneto-optical disk from said magnetic head.

14. A magneto-optical recording apparatus comprising:
   a magnetic head applying a magnetic field to a magneto-optical recording medium in a region wider than a minimum bit record area thereby forming a magnetic field region;

a beam source and an optical system forming on said magneto-optical recording medium a laser beam spot defining said minimum bit record area;

modulation means for modulating at least one of said magnetic field and said laser beam thereby forming said laser beam spot within the range of said magnetic field region; and mechanical means for moving said magnetic field region and said laser beam spot relative to each other on said magneto-optical recording medium while said modulation means is under operation; said magnetic head being carried by a magnetic slider for producing lift for causing sufficient floating magnetic head movement to substantially prevent head crash and including at lest two slider rails each having a width not smaller than 2 mm along a length thereof and a tapered portion having a taper angle $\theta t$, wherein $0 < \theta t \leq 1°$, for floating said magnetic head to be spaced apart from a surface of said magneto-optical recording medium by a distance not smaller than 10 $\mu$m while said mechanical means is under operation.

15. A magneto-optical recording apparatus according to claim 14, wherein said head slider utilizes an air pressure for floating said magnetic head away from said magneto-optical recording medium.

16. A magneto-optical recording apparatus according to claim 15, wherein a suspension spring supporting said magnetic head slider applies a pressurizing load not larger than 6 gw.

17. A magneto-optical recording apparatus according to claim 15, wherein the area of said magnetic field region provided by the magnetic field applied to said magneto-optical recording medium from said magnetic head is larger than 0.1 mm$^2$.

18. A magneto-optical recording apparatus comprising:

a magnetic head applying a magnetic field to a magneto-optical disk;

a beam source and an optical system directing a laser beam toward a field-applied region of said magneto-optical disk;

rotating means for rotating said magneto-optical disk;

a magnetic head slider carrying said magnetic head for floating it away from said magneto-optical disk with the rotation of said magneto-optical disk; and modulating means for modulating at least one of said laser beam and said magnetic field by a signal to be recorded, said magnetic head slider having means for producing lift for causing sufficient floating magnetic head movement to substantially prevent head crash including at least two slider rails each having a width not smaller than at least 2 mm along a length thereof, a tapered portion having a taper angle $\theta t$, wherein $0 < \theta t \leq 1°$, and acting to cause floating movement of said magnetic head away from said magneto-optical disk while said modulation means is under operation so that said magnetic head is spaced apart from a surface of said magneto-optical disk by a distance not smaller than 10 $\mu$m.

19. A magneto-optical recording apparatus according to claim 18, wherein said magnetic disk performs its information recording operation in a state floated by a distance of 10 to 50 $\mu$m from the surface of said magneto-optical disk by the function of said magnetic head slider.

20. Magneto-optical recording apparatus according to claim 18, wherein at least one of a contact start and stop operation is carried out at a predetermined time interval when said apparatus is at least one of in a starting state, in a stopped state, and when said apparatus is under operation.

21. A magneto-optical recording apparatus according to claim 18, wherein said suspension spring supports said magnetic head slider by a pivot making linear contact with said suspension spring.

22. A magnetic head slider for carrying a magnetic head used to record a signal on a magneto-optical disk, said magnetic head slider comprising means for producing lift for causing sufficient magnetic head movement to prevent head crash including a plurality of slider rails each having a width not smaller than at least 2 mm along a length thereof and a tapered portion having a taper angle $\theta t$, wherein $0 < \theta t \leq 1°$, so as to provide lift for causing floating movement of said magnetic head and a spacing from a surface of the magnetic-optical disk of at least 10 $\mu$m.

23. A magnetic head slider according to claim 22, wherein said slider has a length not smaller than 5 mm.

24. A magnetic head slider according to claim 22, wherein a the ratio between the length of said tapered portion and the full slider length is selected to be 0.1 to 0.5.

25. A magnetic head slider according to claim 22, wherein the taper angle of said tapered air introducing leading edge portion for producing lift thereby floating said slider is selected to be smaller than 1°.

26. A magnetic head slider according to claim 22, wherein said slider is of a crown type having a slider surface of second degree, and the apex of said slider surface opposite to said magneto-optical disk is located at a position where the ratio of the distance between the apex and the leading edge of said slider to the full slider length is 0.1 to 0.6.

27. A magnetic head slider according to claim 26, wherein said apex of said slider surface projects by a height of 1 to 10 $\mu$m relative to the leading and trailing edges of said slider.

28. A magnetic disk slider according to claim 22, wherein said slider is made of a sintered body of a pore-free or porous material.

* * * * *